…

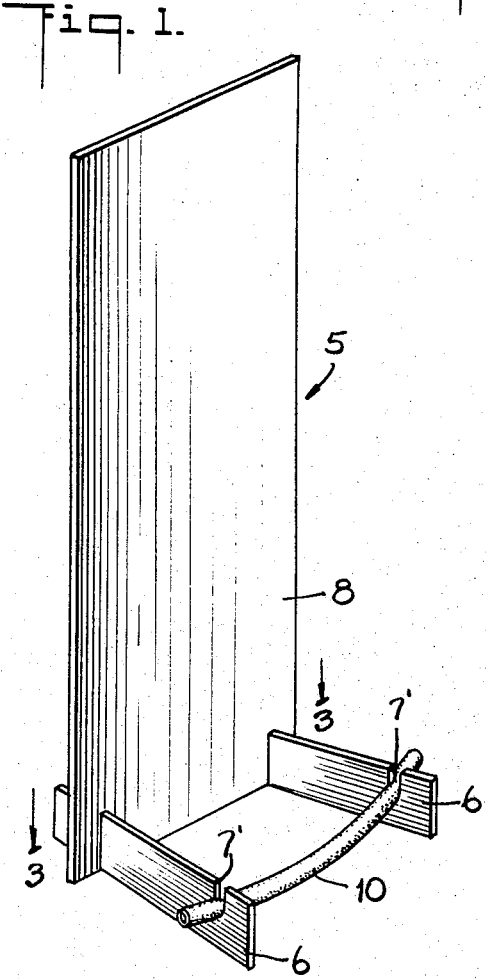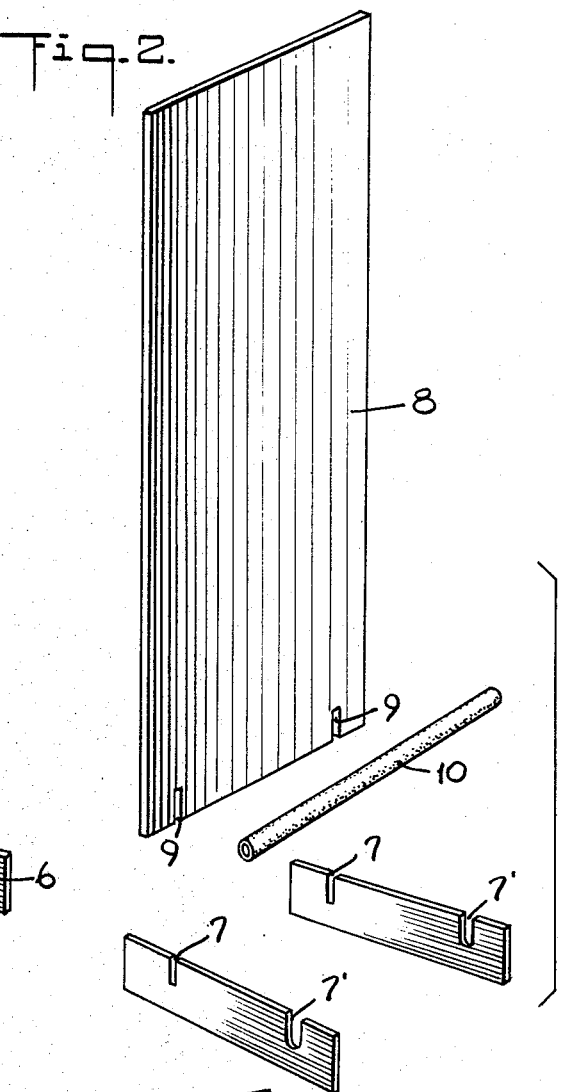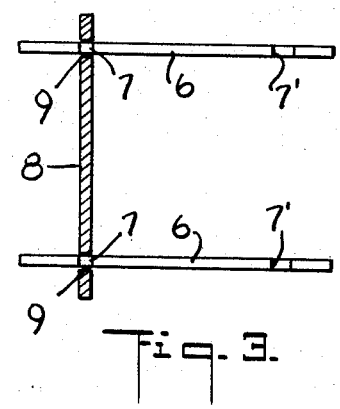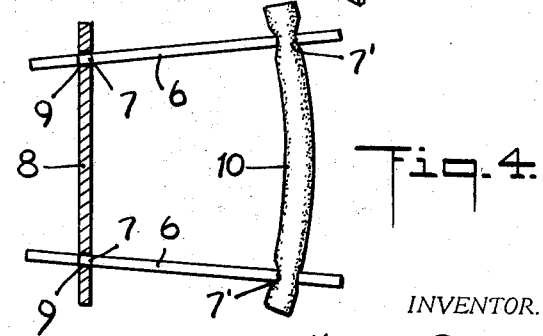

United States Patent Office 3,341,162
Patented Sept. 12, 1967

3,341,162
COMPACT STAND
Hyman Ruchlis, Brooklyn, N.Y., assignor to Harcourt, Brace & World, Inc., New York, N.Y., a corporation of New York
Filed Nov. 12, 1965, Ser. No. 507,510
4 Claims. (Cl. 248—174)

This invention relates to a compact stand. More particularly, this invention relates to a compact stand for utilization as an educational device in applied science projects. Still more particularly this invention relates to a compact display stand having a deformable one piece locking means for securing display material therein.

Heretofore, a number of stands have been utilized for display materials as well as for educational applied science displays and visual aids. However, while several of these stands have used interlocking slotted members to secure the stand components together, none of the stands have overcome the problem of providing a low cost stand which can be easily and rapidly set up and which can be set up a great number of times. Further, none of these stands has utilized an efficient low cost locking means which can be readily used for securing display materials in position.

Accordingly, it is an object of this invention to provide a compact stand which provides an efficient low cost one piece locking means for display materials.

It is another object of this invention to provide an efficient low cost compact stand for display materials which can be rapidly set up.

It is another object of this invention to provide a compact stand for display materials which can be set up a great number of times.

It is another object of this invention to provide a compact stand for display materials which is easily stored.

Generally, the invention provides a compact stand which includes a pair of elongated angularly disposed legs each having a pair of spaced slots, a display board means having a pair of spaced slots in its base and being mounted on the legs in one of the slots in each of the legs with each slot in the display board receiving one of the legs, and a one piece locking means deformably received in the remaining slots of each of the legs to maintain the angular disposition of the legs for locking the display board means therein.

In this arrangement, the one piece locking means which is of suitable resilient material to resist longitudinal buckling forms a positive stop between the legs to prevent return of the legs to a parallel relationship and thereby provides an efficient low cost means of locking display material within the stand.

These and other objects and advantages of the invention will become more apparent from the following detailed description and appended claims taken in conjunction with the accompanying drawings in which:

FIG. 1 illustrates a perspective view of a compact stand of this invention with the legs angularly disposed to each other;

FIG. 2 illustrates an exploded view of the compact stand of FIG. 1;

FIG. 3 illustrates a view taken at line 3—3 of FIG. 2 of a display board means mounted in the legs before insertion of the locking means; and FIG. 4 illustrates a view similar to FIG. 3 with the locking means in place.

Referring to the drawings, a compact stand 5 is formed of a pair of legs 6, each of which has a pair of spaced slots 7, 7' in its topmost surface. The legs 6 are initially orientated to receive a display board means 8 within the respective slots 7 so that the display board means 8 is mounted perpendicularly to the legs 6. The display board means 8 is also provided with a pair of slots 9 which are adapted to mate with the slots 7 in the respective legs 6 when the display board means 8 is suitably mounted on the legs 6. The display board means is shown in the drawings a single board; however, it is intended that the terminology "display board means" be descriptive of any suitable display material or board for displaying materials thereon.

Initially, the display board means 8 is inserted into the legs 6 when the legs are in parallel relation with each other. Thereafter, the legs 6 are disposed angularly with respect to each other so as to tighten the grip of the legs 6 on the display board means 8 and a suitable one piece locking means, for example, a radially deformable tube 10 of suitable resilient material, such as, a plastic, is inserted into the slots 7' of the legs 6 to maintain the angular disposition of the legs 6. The tube 10 is of a diameter greater than the width of the slots 7', for example, by a 2 to 1 ratio, so that upon insertion into the slots 7', the tube 10 is radially deformed thereat. The tube 10 thus has a portion of a greater width than the slots 7' between the legs 6 so as to form a positive stop preventing return of the legs 6 to their initial parallel condition.

The one piece locking means can be of any suitable shape other than tubular which allows it to be deformably inserted into the slots 7' to form the positive stop between the legs, for example, a solid or hollow oval shape. In addition, the locking means can be of any suitable resilient material which resiliently returns the locking means to its original shape after being removed from the slots 7' and which resists any longitudinal buckling forces created thereon by the legs 6 being urged back into parallelism.

It is noted that the slots 7 are shown in the drawings as being wider than the slots 7'; however, such need not be the case in all modifications of the invention since the respective slots need only be designed for the components to be inserted therein. Further, the slots 7, 7' may be of the same size and at the same relative positions so that the legs 6 can be reversed with respect to each other.

It is also noted that the slots 7 are usually of a size to provide an initial loose fit of the display board means 8 in the legs 6. This will facilitate insertion of the display board means 8 in the legs 6 as well as overcoming any inaccuracies in production and normal wear in usage.

The stand 5 is rapidly disassembled by merely lifting the deformable resilient tube 10 out of one of the legs 6 so as to unlock the legs 6 and allow the display board means 8 to be removed.

The deformable one piece locking means allows the legs 6 of the stand 5 to be angularly disposed at any suitable angle. For example, with the legs disposed so as to barely create a slight frictional force on the display board means 8 to lock it in position there will be little or no longitudinal buckling force imposed on the locking means. However, with the legs further disposed from this position to increase the locking force on the display board means 8, there will be longitudinal buckling forces imposed on the locking means but because of its resistance to buckling, the locking means will substantially maintain the legs 6 in this further disposed position.

Thus, the deformable locking means is adapted for many locking positions without any need to precisely form it in relation to the remainder of the stand. Likewise, because of the nature of the locking arrangement there is no need to accurately form any components of the stand to insure their usefulness.

The stand has a great number of uses for displaying materials. However, the primary use is as an educational device, since it is desirable to have low cost educational devices and visual aids which are easily and rapidly set up and which will have a prolonged useful life. The stand of this invention satisfies all the desired needs as an educational device. Further, since the stand can be made within a range of compact sizes, it can satisfy many of the space limitation requirements of educational institutions, for example, the stand can be desk mounted, table mounted or floor mounted depending upon the material to be displayed.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A compact stand for display materials including a pair of elongated angularly disposed legs, each of said legs having a pair of spaced slots therein, a display board means mounted on said pair of legs in one of said slots in each of said legs, said display board having a pair of spaced slots in the base thereof each receiving one of said legs therein, a one piece resilient locking means deformably received in the other of said slots in each of said legs to form a positive stop between said legs to maintain the angular disposition of said legs for locking said display board in said pair of legs.

2. A compact stand for display materials as described in claim 1 wherein said locking means is of a material which returns said locking means to its original shape after removal from said other slots and which resists longitudinal buckling.

3. A compact stand for display materials as described in claim 2 wherein said locking means is a tube.

4. A compact stand for display materials as described in claim 3 wherein said tube is made of plastic.

References Cited

UNITED STATES PATENTS

| | | | |
|---|---|---|---|
| 2,662,713 | 12/1953 | Johnson | 248—176 |
| 2,693,209 | 11/1954 | English | 248—176 X |
| 3,023,725 | 3/1962 | Boyd | 248—174 X |
| 3,282,437 | 11/1966 | Hansen | 248—460 X |

ROY D. FRAZIER, *Primary Examiner.*

J. F. FOSS, *Assistant Examiner.*